United States Patent
Wu et al.

(10) Patent No.: US 11,260,382 B2
(45) Date of Patent: Mar. 1, 2022

(54) CORE-SHELL CATALYST, PREPARATION METHOD THEREFOR AND APPLICATION THEREOF TO CATALYTIC OZONATION

(71) Applicant: SOOCHOW UNIVERSITY, Suzhou (CN)

(72) Inventors: Duo Wu, Suzhou (CN); Xingmin Gao, Suzhou (CN); Zhangxiong Wu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 162 days.

(21) Appl. No.: 16/771,338

(22) PCT Filed: Jan. 4, 2018

(86) PCT No.: PCT/CN2018/071343
§ 371 (c)(1),
(2) Date: Jun. 10, 2020

(87) PCT Pub. No.: WO2019/127632
PCT Pub. Date: Jul. 4, 2019

(65) Prior Publication Data
US 2020/0360913 A1    Nov. 19, 2020

(30) Foreign Application Priority Data
Dec. 27, 2017 (CN) .......................... 201711444509.5

(51) Int. Cl.
*B01J 35/00* (2006.01)
*B01J 37/00* (2006.01)
(Continued)

(52) U.S. Cl.
CPC ............. *B01J 35/008* (2013.01); *B01J 21/04* (2013.01); *B01J 23/745* (2013.01);
(Continued)

(58) Field of Classification Search
None
See application file for complete search history.

(56) References Cited

FOREIGN PATENT DOCUMENTS

CN    103977800 A    8/2014
CN    104525172 A    4/2015
(Continued)

OTHER PUBLICATIONS

Machine translation of Jin, CN104759286A (Year: 2015).*
(Continued)

*Primary Examiner* — Melissa S Swain
*Assistant Examiner* — Keling Zhang
(74) *Attorney, Agent, or Firm* — SZDC Law P.C.

(57) ABSTRACT

The invention discloses a core-shell structured catalyst comprising a core covered with a shell. The core is made of hematite, tourmaline, germanium, maifanite or kaolin. The invention also provides a method for preparing the catalyst including mixing raw materials of the core with water to form seed-balls with a particle size of 2-4 mm; mixing the seed-balls with raw materials of the shell and water, such that the seed-balls are covered with the raw materials of the shell to form pellets with a particle size of 3-5 mm; processing the pellets at 60-90° C. and then calcining to active the pellets at 450-550° C. to obtain a core-shell structured catalyst. The invention further discloses use of the core-shell structured catalyst in the ozone oxidation reaction. In the invention, a core-shell structured catalyst with good morphology and catalytic performance is prepared, and the production cost of the catalyst is reduced.

10 Claims, 6 Drawing Sheets

(51) Int. Cl.
  *B01J 21/04* (2006.01)
  *B01J 23/745* (2006.01)
  *B01J 37/02* (2006.01)
  *B01J 37/08* (2006.01)
  *B01J 37/14* (2006.01)

(52) U.S. Cl.
  CPC ....... *B01J 37/0063* (2013.01); *B01J 37/0221* (2013.01); *B01J 37/082* (2013.01); *B01J 37/14* (2013.01)

(56) References Cited

FOREIGN PATENT DOCUMENTS

| | | |
|---|---|---|
| CN | 104759286 A | 7/2015 |
| CN | 105536773 A | 5/2016 |
| JP | H05192535 A | 8/1993 |

OTHER PUBLICATIONS

Valekar et al., Shaping of porous metal-organic framework granules using mesoporous ρ-alumina as a binder, RSC Adv., 2017, 7, 55767-55777 (published on Dec. 8, 2017) (Valekar) (Year: 2017).*

Guo Han et al., "Degradation of Phenol by O3, TIO2 and GAMA-AL2O3", Water Resources Protection, vol. 24, No. 5, Sep. 2008, pp. 83-90.

Yin Yan-guo et al., "Study on Shaped Technology of p-AL2O3", Shandong Metallurgy, vol. 30, No. 6, Dec. 31, 2008, pp. 51-52.

* cited by examiner

CORE-SHELL CATALYST, PREPARATION METHOD THEREFOR AND APPLICATION THEREOF TO CATALYTIC OZONATION

This application is the National Stage Application of PCT/CN2018/071343, filed on Jan. 4, 2018, which claims priority to Chinese Patent Application No. 201711444509.5, filed on Dec. 27, 2017, which is incorporated by reference for all purposes as if fully set forth herein.

FIELD OF THE INVENTION

The invention relates to the technical field of catalyst preparation and the field of sewage treatment, more particularly discloses a core-shell structured catalyst, a preparation method and use in catalytic ozonation reaction thereof.

BACKGROUND OF THE INVENTION

Ozone has a very strong oxidizing ability and can directly oxidize and degrade organic matters, but its oxidation selectivity restricts its ability to deeply mineralize organics in sewage. In order to improve the utilization rate of ozone and its ability to deeply treat sewage, a commonly used method is to add a catalyst to an ozone oxidation sewage system. The catalyst can decompose ozone catalytically, which is converted into hydroxyl radicals with strong oxidation performance. Hydroxyl radicals can substantially oxidize all organic substances and thus have the ability to deeply treat sewage.

The currently used catalysts include homogeneous and heterogeneous catalysts. Homogeneous catalysts may not be affected by interphase diffusion and thus are easy to be controlled, but it is difficult to separate and recycle the metal ions which are placed into the water, which will result in a high concentration of metal ions in the water to cause a secondary pollution to the environment and increase the operation costs. Heterogeneous catalysts can avoid the defects of homogeneous catalysts, but as compared with homogeneous catalysts, there are other problems such as interphase diffusion resistance and low contact rate between active sites and reaction substrates. Therefore, for commercial application of the heterogeneous catalysts, the most important prerequisites are to improve the catalytic performance, reduce the production cost, and simplify the process of large-scale production.

In addition, catalyst costs account for the largest part of the cost of catalytic ozonation treatment of sewage systems. A lot of money is required to purchase catalysts in sewage treatment, which has greatly hindered the promotion of sewage treatment technology of catalytic ozonation. Therefore, the key problem to be solved for technicians is how to reduce the cost of the catalyst while ensuring the performance of the catalyst. Many researchers use low-priced raw materials, such as $Fe_2O_3$ and $MnO_2$, to produce spherical catalysts with a particle size of 3-5 mm, but the catalysts often have poor catalytic performance and cannot satisfy the requirements of reduced cost and good catalyst performances meanwhile. The catalyst materials with better catalytic performance are $La_2O_3$, CuO, $TiO_2$, $MnO_2$, $Fe_2O_3$, $CeO_2$, etc., which are more expensive and thus not only result in great economic pressure on production, but also restrict the promotion of catalytic ozonation technology in the field of sewage treatment.

SUMMARY OF THE INVENTION

In order to solve the above technical problems, an object of the present invention is to provide a core-shell structured catalyst, a preparation method and use in catalytic ozonation reaction thereof. In the method of the invention, a core-shell structured catalyst is prepared, which has good morphology as well as good catalytic performance, and the production cost of the catalyst is reduced.

In one aspect, the invention provides a core-shell structured catalyst, comprising a core covered with a shell, the core has a particle size of 2-4 mm, and the shell has a thickness of 0.5-1.5 mm. The core is made of hematite, tourmaline, germanium, maifanite or kaolin, and the shell is made of ρ-type alumina and an active ingredient, wherein the active ingredient is selected from the group consisting of lanthanum oxide ($La_2O_3$), copper oxide (CuO), titanium oxide ($TiO_2$), manganese oxide ($MnO_2$), iron oxide ($Fe_2O_3$), and cerium oxide ($CeO_2$) and any combination thereof.

Preferably, the mass ratio of the ρ-type alumina to the active ingredient is 90-96:4-10. The ρ-type alumina has the advantages of stable physical and chemical properties, large mechanical strength, and easy to mold.

In another aspect, the invention also provides a method for preparing the core-shell structured catalyst, which includes the following steps:

(1) mixing raw materials of the core with water to form seed-balls with a particle size of 2-4 mm, wherein the raw materials of the core are hematite, tourmaline, germanium, maifanite or kaolin;

(2) mixing the seed-balls with raw materials of the shell and water, such that the seed-balls are covered with the raw materials of the shell to form pellets with a particle size of 3-5 mm, wherein the raw materials of the shell are ρ-type alumina and an active ingredient, the active ingredient is selected from the group consisting of lanthanum oxide, copper oxide, titanium oxide, manganese oxide, iron oxide, and cerium oxide and any combination thereof, and the mass ratio of the ρ-type alumina to the active ingredient is 90-96:4-10;

(3) processing the pellets at a constant temperature of 60-90° C. for 10-24 hrs, and then calcining to active the pellets at 450-550 ° C. for 2-5 hrs, to obtain the core-shell structured catalyst.

Preferably, in step (1), the raw material of the core has a particle size of 200-325 mesh.

Preferably, in step (1), the mass ratio of the raw material of the core to water is 1-2:1.

Preferably, in step (2), the mass ratio of the seed-balls to the raw materials of the shell and water is 1.5-2.5:1.

Preferably, in steps (1) and (2), granulation is performed by a spheronization molding process. The spheronization molding process has advantages of high efficiency, simple operating and easy to scale up and so on.

More preferably, in step (1), the granulation is performed by a spheronizer, and the spheronization molding process comprises placing the raw material of the core to a disc of the spheronizer and spraying a mist of water as a binder to form seed-balls, wherein the rotation speed of the disc of the spheronizer is 30-70 rpm.

More preferably, in step (2), the granulation is performed by a spheronizer, and the spheronization molding process comprises placing the seed-balls, the raw materials of the shell to a disc of the spheronizer and spraying a mist of water as a binder to form pellets, wherein the rotation speed of the disc of the spheronizer is 20-60 rpm.

In step (1), the seed-balls have a particle size of 1-2 mm, and the balls with such a range of diameter has a relatively appropriate area-volume ratio, which can ensure that in the subsequent steps the raw materials are tightly covered on the surface of the seed-balls without falling off. Then, the spherical pellets with a particle size of 3-5 mm are prepared, and the pellets with this range of diameter can facilitate the reaction substrates in the solution to diffuse into the particles, and also can reduce the pressure drop in the reaction cell and thus reduce the energy consumption.

Preferably, in step (3), the pellets are processed at a constant temperature of 60-90° C. under a sealed condition.

Step (3) is performed in a moderate temperature range of 60-90° C., which can not only promote the hydration reaction of ρ-type alumina powder and water to obtain samples with greater mechanical strength by means of the cohesion-action of the ρ-type alumina powder, but also can also make the samples have a good spherical morphology without cracking. After activation at a high temperature, the absorbed water and crystal water are removed to form pores in the samples, which promotes the mass transfer and diffusion of the reaction substrate ozone and organic compounds in an external solution, thereby improving the catalytic performance of the catalyst; meanwhile the ρ-type alumina is converted into γ-type alumina. Temperature is an important factor that may affect the structure and properties of the catalyst. Only the catalyst samples obtained in the temperature range of 450-550° C. have a higher specific surface area and a multi-stage pore channel structure.

In a further aspect, the invention further discloses use of the above core-shell structured catalyst in the ozone oxidation reaction.

Preferably, in the ozone oxidation reaction, ozone is used to oxidize sodium oxalate, phenol, ρ-diphenol, benzoquinone, tetranitrophenol, benzene, toluene and any combination thereof.

Preferably, in the ozone oxidation reaction, the amount of ozone is 0.2-1.2 g/L, and the amount of the core-shell structured catalyst is 5-15 g/L.

By means of the above technical solution, the present invention has the following advantages:

In the invention a catalyst is prepared by a stepped spheronization molding process, the catalyst has a core made of cheap hematite with a low catalytic activity and a shell made of expensive raw material with a high catalytic activity. First, the cheap and easily available hematite is used as the raw material to produce the core of the catalyst; then the inner core is covered with a high catalytic activity shell. By adopting the process of the present invention, the prepared core-shell structured catalyst can maintain a good spherical morphology, has a large mechanical strength (>80 N), and has a relatively good magnetic property. Furthermore, all the catalyst samples are not cracked.

The average price of hematite powder in the chemical raw materials market is 700 yuan/ton, the price of ρ-type alumina powder is 3300 yuan/ton, and the prices of the active ingredients $La_2O_3$, CuO, $TiO_2$, $MnO_2$, $Fe_2O_3$, $CeO_2$ and others are: 20000, 40000, 40000, 8000, 7000, 20,000 yuan/ton respectively. And 29.6-51.2 wt % of the catalyst of the present invention is inexpensive hematite component, which greatly reduces the production cost of the catalyst, meanwhile it is ensured that the catalyst has a relatively good catalyst performance.

The catalyst of the invention can be used in the reaction system of catalytic ozonation. The solution and ozone in waste water can quickly diffuse to the particle shell, and the active sites of the active ingredients in the shell layer can promote the reaction of catalytic ozonation of organics. The influence on the reaction rate caused by diffusion of the reaction substrate to the particle core in the reaction system is avoided. Thus, the catalytic performance of the catalyst is ensured, the utilization rate of the active ingredients of the catalyst is ensured, and the production cost of the catalyst is reduced greatly, which are beneficial to the promotion of the catalytic ozonation technology in the field of sewage treatment.

The above description is only an overview of the technical solution of the present invention. In order to illustrate the technical means of the present invention more clearly and implement the technical solution in accordance with the specification, the preferred embodiments of the invention are described hereinafter in more detail by reference to the drawings attached.

DETAILED DESCRIPTION OF THE INVENTION

The invention will be further illustrated in more detail with reference to the accompanying drawings and embodiments. It is noted that, the following embodiments only are intended for purposes of illustration, but are not intended to limit the scope of the present invention.

EXAMPLE 1

This example provides a method for preparing a core-shell structured catalyst, including the following steps:

(1) Hematite was ground and sieved through a 325 mesh sieve to obtain the hematite powder. A spheronization molding process was performed by a spheronizer, a spheronizing disc having a diameter of 1-3 m was selected, and the hematite powder was added continuously into the operating spheronizing disc at a feed rate of 100 kg/h, and then water was sprayed into the spheronizing disc at a rate of 50 kg/L, when small balls with a diameter of about 2-4 mm were obtained, the desired seed-balls were took out and ready for use.

(2) The seed-balls were added into a spheronizing disc containing the raw materials of the shell, which were CuO and ρ-type alumina with a mass ratio of 4:96.

(3) The rotation speed of the spheronizing disc was set as 20-60 rpm, with a water spraying rate of 50 kg/h, such that the particles have a good sphericity. When the particle size was within the range of 3-5 mm, the product was continuously collected to obtain spherical pellets.

(4) The collected pellets were placed in a sealed system and processed at 90° C. for 24 hrs.

(5) The pellets obtained in step (4) were added into a vertical kiln. By controlling the discharging speed at the bottom of the kiln, the pellets were adjusted to stay at a constant temperature area (450° C.) in the kiln for 3 hrs to form an ozone oxidation catalyst.

Figure 1:
FIG. 1 is an optical photograph of the core-shell structured catalyst according to Example 1.
Figure 2:
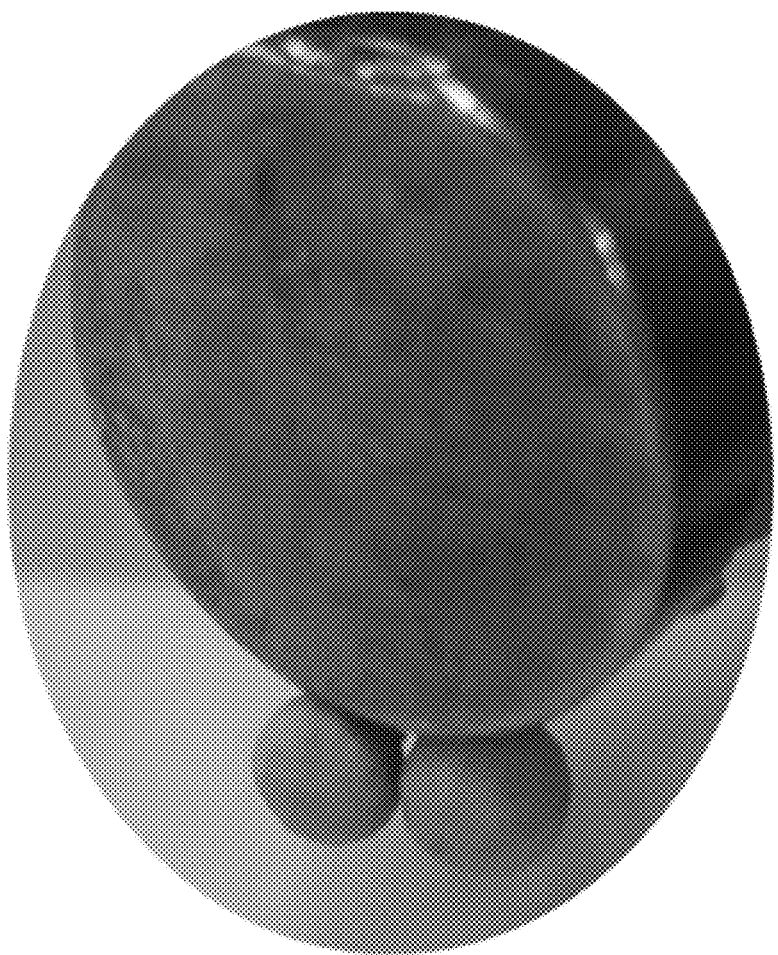
FIG. 2 is an optical photograph showing the magnetic properties of the sample according to Example 1.
Figure 3:
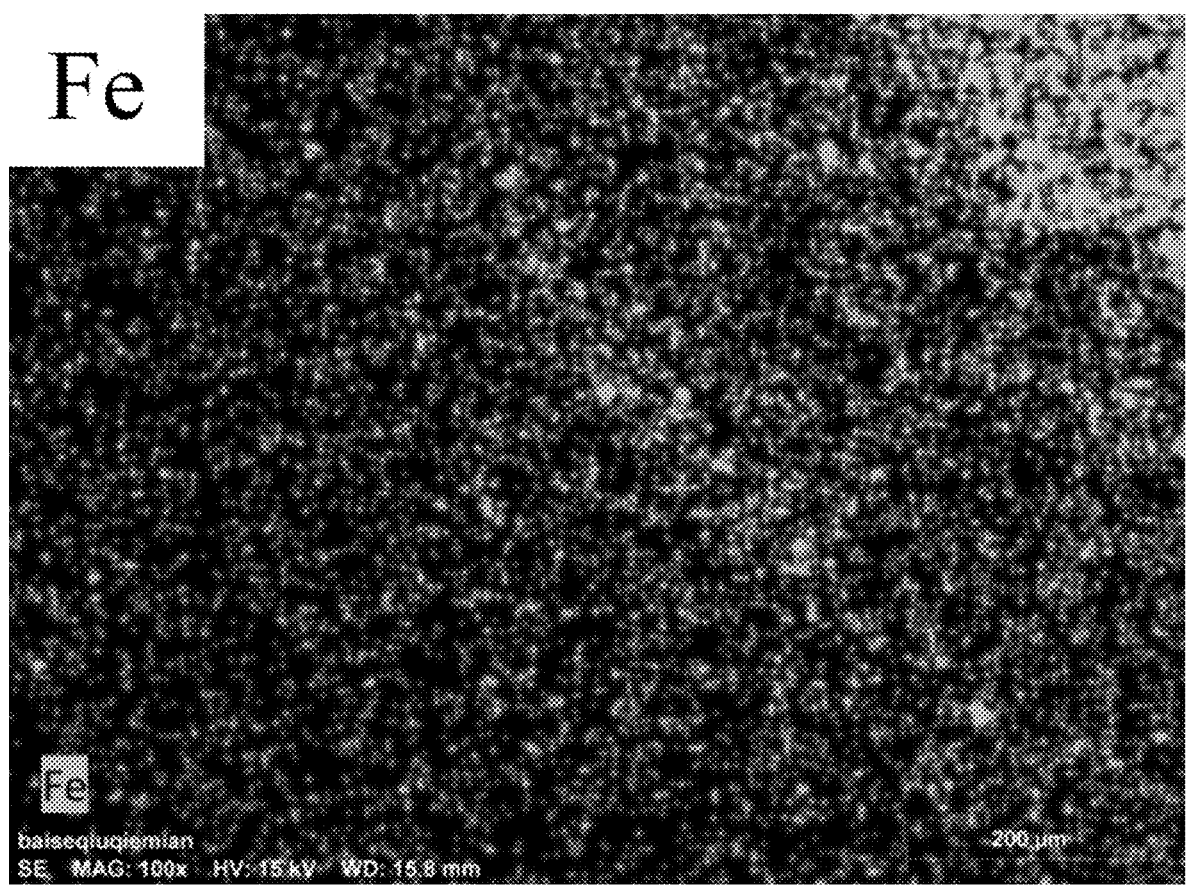
FIG. 3 is an energy dispersive X-ray spectrum of iron element of the core-shell structured catalyst according to Example 1.
Figure 4:
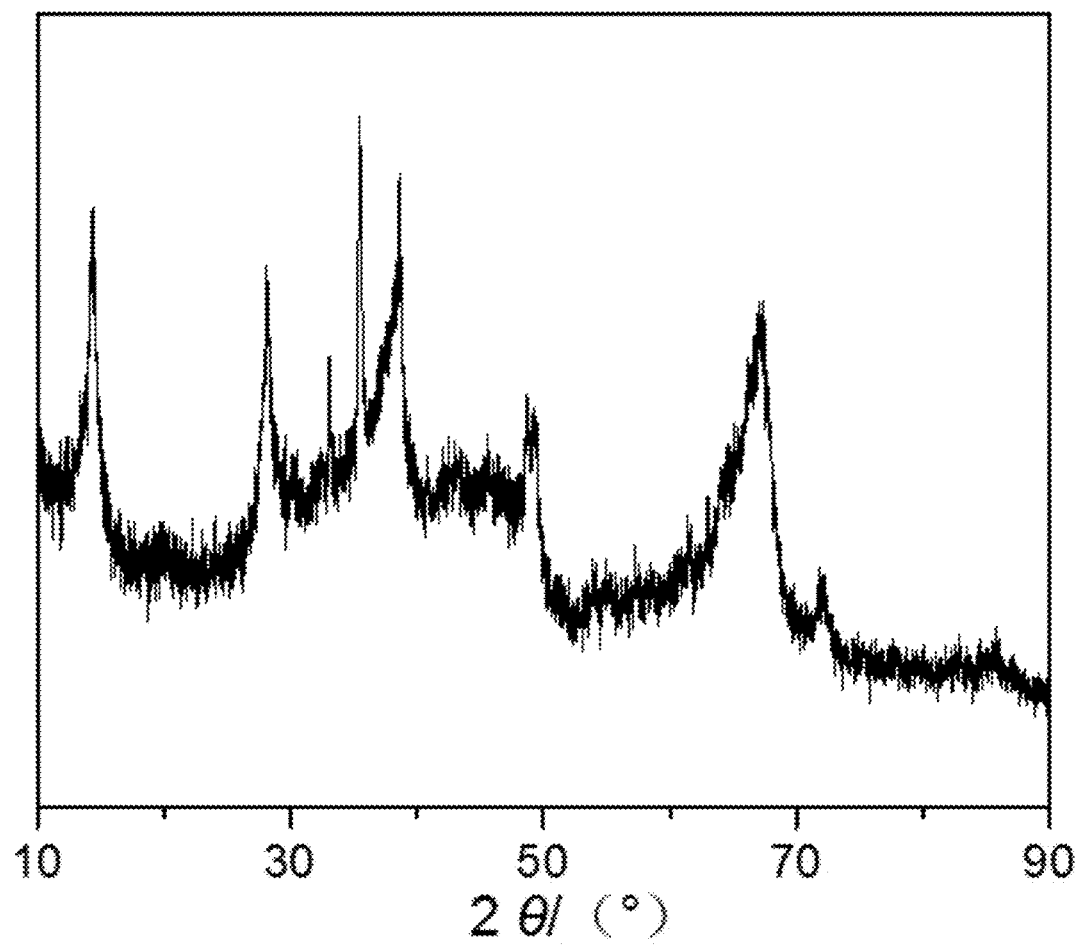
FIG. 4 is an X-ray diffraction spectrum of the core-shell structured catalyst according to Example 1.

FIG. 1 is an optical photograph of the product of Example 1. From the picture, it can be seen that the surface of the particles has a color resulted from the mixture of white alumina and black copper oxide; the internal part of the particles being cut is red hematite. It shows that the particles with a core-shell structure were prepared successfully by this process. FIG. 2 is an optical photograph showing the product of Example 1 being attracted onto a magnet, which indicates that the sample has a good magnetic property. FIG. 3 is an energy dispersive X-ray spectrum of iron element of the product of Example 1. It can be seen, from the figure, that the iron element is intensively distributed inside the particles, which demonstrates the core-shell structure of the sample. FIG. 4 is an X-ray diffraction spectrum of the product of Example 1. Characteristic peaks of copper oxide, hematite, and γ-alumina can be seen from the spectrum.

EXAMPLE 2

This example provides a method for preparing the core-shell structured catalyst, including the following steps:

(1) Tourmaline was ground and sieved through a 325 mesh sieve to obtain the tourmaline powder. A spheronization molding process was performed by a spheronizer, a spheronizing disc having a diameter of 1-3 m was selected, and the tourmaline powder was added continuously into the operating spheronizing disc at a feed rate of 100 kg/h, and then water was sprayed into the spheronizing disc at a rate of 50 kg/L, when balls with a diameter of about 2-4 mm were obtained, the desired seed-balls were took out and ready for use.

(2) The seed-balls were added into a spheronizing disc containing the raw materials of the shell, which were $La_2O_3$, $TiO_2$ and ρ-type alumina with a mass ratio of 10:90.

(3) The rotation speed of the spheronizing disc was set as 20-60 rpm with a water spraying rate of 50 kg/h, such that the particles have a good sphericity. When the particle size was within the range of 3-5 mm, the product was continuously collected to obtain spherical pellets.

(4) The collected pellets were placed in a sealed system and processed at 60° C. for 24 hrs.

(5) The pellets obtained of step (4) were added into a vertical kiln. By controlling the discharging speed at the bottom of the kiln, the pellets were adjusted to stay at a constant temperature area (550° C.) in the kiln for 3 hrs to form an ozone oxidation catalyst.

EXAMPLE 3

This example provides a method for preparing a core-shell structured catalyst, including the following steps:

(1) Germanite was ground and sieved through a 325 mesh sieve to obtain the germanite powder. A spheronization molding process was performed by a spheronizer, a spheronizing disc having a diameter of 1-3 m was selected, and the germanite powder was added continuously into the operating spheronizing disc at a feed rate of 100 kg/h, and then water was sprayed into the spheronizing disc at a rate of 50 kg/L, when balls with a diameter of about 2-4 mm were obtained, the desired seed-balls were took out and ready for use as.

(2) The seed-balls were added into a spheronizing disc containing the raw materials of the shell, which were $TiO_2$, $Fe_2O_3$ and ρ-type alumina with a mass ratio of 4:96.

(3) The rotation speed of the spheronizing disc was set as 20-60 rpm with a water spraying rate of 50 kg/h, such that the particles have a good sphericity. When the particle size was within the range of 3-5 mm, the product was continuously collected to obtain spherical pellets.

(4) The collected pellets were placed in a sealed system and processed at 90° C. for 24 hrs.

(5) The pellets processed obtained of step (4) were added into a vertical kiln. By controlling the discharging speed at the bottom of the kiln, the pellets were adjusted to stay at a constant temperature area (500° C.) in the kiln for 3 hrs to form an ozone oxidation catalyst.

EXAMPLE 4

This example provides a method for preparing a core-shell structured catalyst, including the following steps:

(1) Kaolin was ground and sieved through a 325 mesh sieve to obtain the kaolin powder. A spheronization molding process was performed by a spheronizer, a spheronizing disc having a diameter of 1-3 m was selected, and the kaolin powder was added continuously into the operating spheronizing disc at a feed rate of 100 kg/h, and water was sprayed into the spheronizing disc at a rate of 50 kg/L, when balls with a diameter of about 2-4 mm were obtained, the desired seed-balls were took out and ready for use.

(2) The seed-balls were added into a spheronizing disc containing the raw materials of the shell, which were $MnO_2$ and ρ-type alumina with a mass ratio of 4:96.

(3) The rotation speed of the spheronizing disc was set as 20-60 rpm with a water spraying rate of 50 kg/h, such that the particles have a good sphericity. When the particle size was within the range of 3-5 mm, the product was continuously collected to obtain spherical pellets.

(4) The collected pellets were collected in a sealed system and processed at 90° C. for 24 hrs.

(5) The pellets obtained in step (4) were added into a vertical kiln. By controlling the discharging speed at the bottom of the kiln, the pellets were adjusted to stay at a constant temperature area (450° C.) in the kiln for 3 hrs to form an ozone oxidation catalyst.

EXAMPLE 5

This example provides a method for preparing a core-shell structured catalyst, including the following steps:

(1) Hematite was ground and sieved through a 325 mesh sieve to obtain the hematite powder. A spheronization molding process was performed by a spheronizer, a spheronizing disc having a diameter of 1-3 m was selected, and the hematite powder was added continuously into the operating spheronizing disc at a feed rate of 100 kg/h, and water was sprayed into the spheronizing disc at a rate of 50 kg/L, when small balls with a diameter of about 2-4 mm were obtained, the desired seed-balls were took out and ready for use.

(2) The seed-balls were added into a spheronizing disc containing the raw materials of the shell, which were $Fe_2O_3$ and ρ-type alumina with a mass ratio of 4:96.

(3) The rotation speed of the spheronizing disc was set as to 20-60 rpm with a water spraying rate of 50 kg/h, such that the particles have a good sphericity. When the particle size was within the range of 3-5 mm, the product was continuously collected to obtain spherical pellets.

(4) The collected pellets were placed in a sealed system and processed at 90° C. for 24 hrs.

(5) The pellets obtained in step (4) were added into a vertical kiln. By controlling the discharging speed at the bottom of the kiln, the pellets were adjusted to stay at a constant temperature (450° C.) area in the kiln for 3 hrs to form an ozone oxidation catalyst.

EXAMPLE 6

This example provides a method for preparing a core-shell structured catalyst, including the following steps:

(1) Maifanite was ground and sieved through a 200 mesh sieve to obtain the maifanite powder. A spheronization molding process was performed by a spheronizer, a spheronizing disc having a diameter of 1-3 m was selected, and the maifanite powder was added continuously into the operating spheronizing disc at a feed rate of 100 kg/h, and then water was sprayed into the spheronizing disc at a rate of 50 kg/L, when small balls with a diameter of about 2-4 mm were obtained, the desired seed-balls were took out and ready for use.

(2) The seed-balls were added into a spheronizing disc containing the raw material of the shell, which were $CeO_2$ and ρ-type alumina with a mass ratio of 10:90.

(3) The rotation speed of the spheronizing disc was set as 20-60 rpm with a water spraying rate of 50 kg/h, such that the particles have a good sphericity. When the particle size was within the range of 3-5 mm, the product was continuously collected to obtain spherical pellets.

(4) The collected pellets were placed in a sealed system and processed at 90° C. for 24 hrs.

(5) The pellets obtained in step (4) were added into a vertical kiln. By controlling the discharging speed at the bottom of the kiln, the pellets were adjusted to stay at a constant temperature area (450° C.) for 3 hrs to form an ozone oxidation catalyst.

EXAMPLE 7

Using the above method, the catalyst was prepared by one-step spheronization molding process, the specific process was as follows:

(1) ρ-type alumina of 325 mesh was uniformly mixed with copper oxide to obtain a mixture, wherein the mixture contains 4-10 wt % of copper oxide. The spheronization molding was performed by a spheronizer. A spheronizing disc having a diameter of 1-3 m was selected, and the mixture was added continuously into the operating spheronizing disc at a feed rate of 100 kg/h, and a suitable amount of water was sprayed into the spheronizing disc at a rate of 50 kg/L, when the diameter of pellets was about 3-5 mm, the pellets were took out and ready for use.

(2) The collected pellets were placed in a sealed system and processed at 90° C. for 24 hrs.

(3) The pellets obtained in step (2) were added into a vertical kiln. By controlling the discharging speed at the bottom of the kiln, the pellets were adjusted to stay at a constant temperature area (450° C.) in the kiln for 3 hrs to form an ozone oxidation catalyst.

Figure 5:
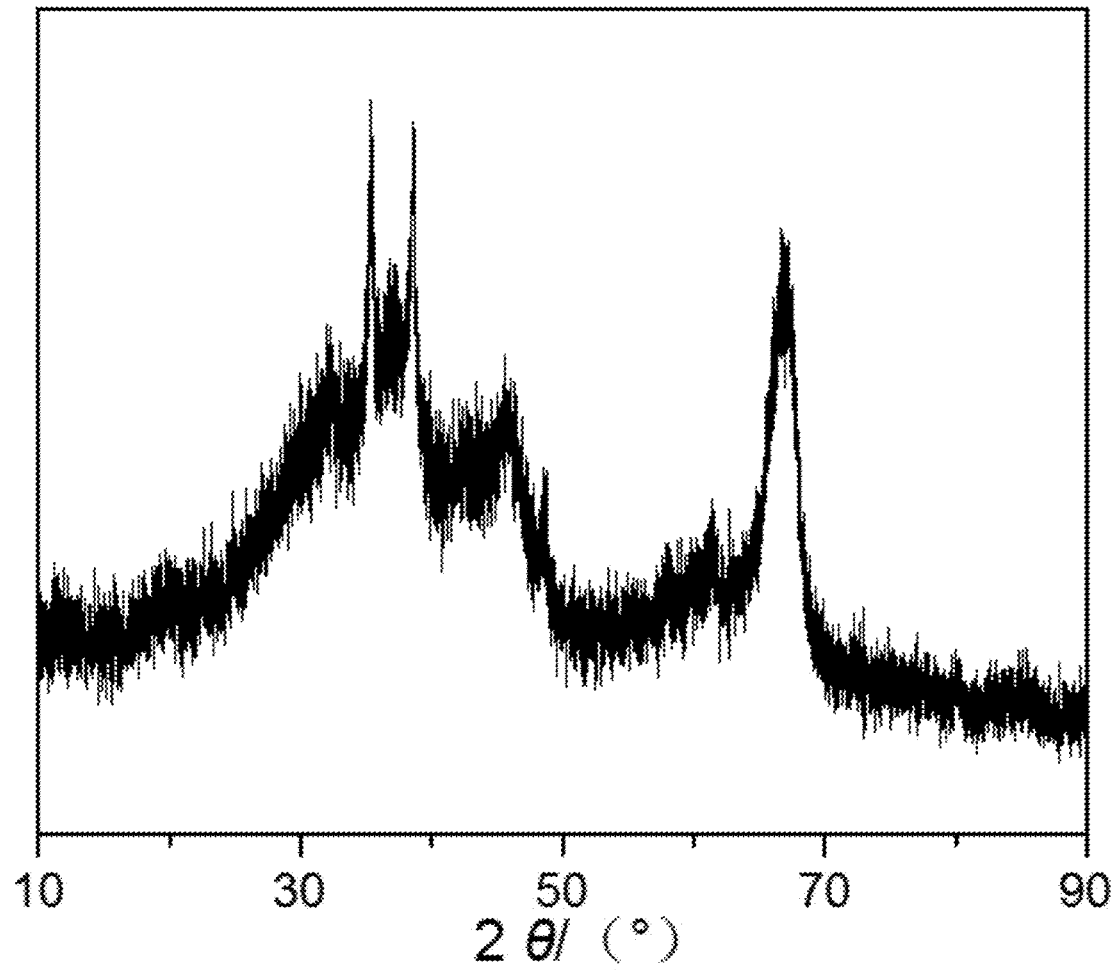
FIG. 5 is an X-ray diffraction spectrum of the core-shell structured catalyst according to Example 7.

FIG. 5 is an X-ray diffraction spectrum of the sample of Example 7. Characteristic peaks of copper oxide, hematite, and y-alumina can be seen from the spectrum.

EXAMPLE 8

The catalyst of the invention was applied to degradation of sodium oxalate-containing wastewater by the catalytic ozonation, and the specific steps were as follows:

Sodium oxalate was selected as the simulated pollutant, and the concentration of sodium oxalate in the aqueous sodium oxalate solution was 1.2 g/L. The catalysts of Examples 1 and 7 of the present invention were added to the formulated aqueous sodium oxalate solutions respectively, wherein the mass-volume ratio of the catalyst and the aqueous solution was 10 g:1 L. Magnetic stirring or mechanical stirring was performed to ensure that the uniform reaction inside the reaction container. Ozone was then introduced, and the ratio of the amount of ozone to the wastewater was 0.5 g:1 L. The reaction time was 4 h.

Figure 6:
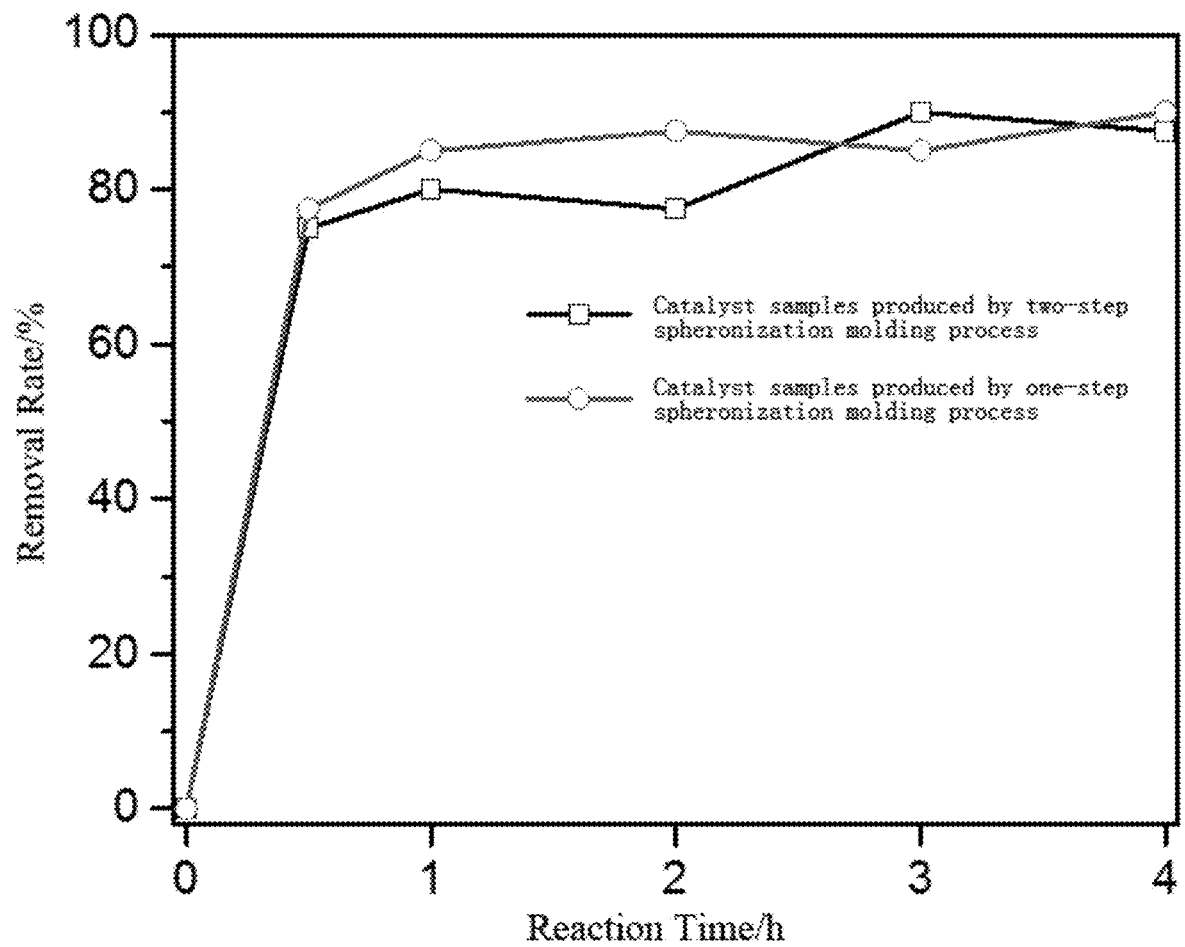
FIG. 6 shows the removal rate of sodium oxalate in the catalytic ozonation reactions of sodium oxalate by different catalysts.

The removal rates of sodium oxalate under two conditions were compared, and the results are shown in FIG. 6. It can be seen from the FIG. 6 that, the respective removal rate of sodium oxalate is 87.5% and 90% by separately using the catalyst prepared by the present invention (a catalyst produced by the two-step spheronization molding process) and the catalyst prepared by the one-step spheronization molding process in the catalytic ozonation reaction, which indicates that the method of the present invention does not affect the catalytic performance of the catalyst and can reduce the production cost. In addition, alumina and hematite are stable as carriers in physical and chemical properties and hardly solved in water, which greatly reduce the catalyst loss and prolong the service life of the catalyst.

The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

The invention claimed is:

1. A core-shell structured catalyst, comprising a core covered with a shell, wherein the core has a particle size of 2-4 mm, the shell has a thickness of 0.5-1.5 mm; wherein the core is made of hematite, tourmaline, germanium, maifanite or kaolin, the shell is made of ρ alumina and an active ingredient, the active ingredient is selected from the group consisting of lanthanum oxide, copper oxide, titanium oxide, manganese oxide, iron oxide, cerium oxide and any combination thereof.

2. The core-shell structured catalyst according to claim 1, wherein a mass ratio of the ρ-alumina to the active ingredient is 90-96:4-10.

3. A method for preparing the core-shell structured catalyst according to claim 1, comprising the steps of:
   (1) mixing a raw material of the core with water to form seed-balls with a particle size of 2-4 mm, wherein the raw material of the core is the hematite, tourmaline, germanium, maifanite or kaolin;
   (2) mixing the seed-balls with raw materials of the shell and water, such that the seed-balls are covered with the raw materials of the shell to form pellets with a particle size of 3-5 mm, wherein the raw materials of the shell are the ρ-alumina and the active ingredient, and the active ingredient is selected from the group consisting of the lanthanum oxide, copper oxide, titanium oxide, manganese oxide, iron oxide, and cerium oxide and any combination thereof; and
   (3) processing the pellets at a constant temperature of 60-90° C. for 10-24 hrs, and then calcining to activate the pellets at 450-550° C. for 2-5 hrs, to obtain the core-shell structured catalyst.

4. The method for preparing a core-shell structured catalyst according to claim 3, wherein in the step (1), the raw material of the core has a particle size of 200-325 mesh.

5. The method for preparing a core-shell structured catalyst according to claim 3, wherein in the step (1), the mass ratio of the raw material of the core to the water is 1-2:1.

6. The method for preparing a core-shell structured catalyst according to claim 3, wherein in the step (2), the mass ratio of the seed-balls to the raw materials of the shell and water is 1.5-2.5:1.

7. The method for preparing a core-shell structured catalyst according to claim 3, wherein in steps (1) and (2), the mixing the raw material of the core with water to form seed-balls and the mixing the raw material of the core with water to form seed-balls are performed by a spheronization molding process.

8. The method for preparing a core-shell structured catalyst according to claim 7, wherein in the step (1), the mixing the raw material of the core with water to form seed-balls is performed by a spheronizer, and the spheronization molding process comprises placing the raw material of the core into a disc of the spheronizer and spraying a mist of the water as a binder to form the seed-balls, wherein a rotation speed of the disc of the spheronizer is 30-70 rpm.

9. The method for preparing a core-shell structured catalyst according to claim 7, wherein in the step (2), the mixing the seed-balls with raw materials of the shell and water is performed by a spheronizer, and the spheronization molding process comprises placing the seed-balls, the raw materials of the shell into a disc of the spheronizer and spraying a mist of the water as a binder to form the pellets, wherein a rotation speed of the disc of the spheronizer is 20-60 rpm.

10. The method for preparing a core-shell structured catalyst according to claim 3, further comprising: applying the core-shell structured catalyst in an ozone oxidation reaction.

\* \* \* \* \*